US009600835B1

(12) United States Patent
Morrison (10) Patent No.: US 9,600,835 B1
(45) Date of Patent: Mar. 21, 2017

(54) PAY-PER CLICK INFORMATION SYSTEM AND METHOD

(75) Inventor: Stephen D. Morrison, Watertown, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2159 days.

(21) Appl. No.: 11/065,490

(22) Filed: Feb. 24, 2005

(51) Int. Cl.
*G06Q 30/00* (2012.01)
*G06Q 30/02* (2012.01)

(52) U.S. Cl.
CPC .............................. *G06Q 30/0277* (2013.01)

(58) Field of Classification Search
USPC .......................................................... 705/14
See application file for complete search history.

(56) References Cited

U.S. PATENT DOCUMENTS

| | | | | |
|---|---|---|---|---|
| 6,102,287 A * | 8/2000 | Matyas, Jr. | ................ | 235/380 |
| 6,102,406 A * | 8/2000 | Miles et al. | ................ | 273/430 |
| 6,826,594 B1 * | 11/2004 | Pettersen | ................ | 709/203 |
| 6,868,525 B1 * | 3/2005 | Szabo | ................ | 715/738 |
| 7,127,617 B2 * | 10/2006 | Wiederin et al. | ................ | 713/193 |
| 7,145,450 B2 * | 12/2006 | Brown | ................ | 340/506 |
| 7,181,438 B1 * | 2/2007 | Szabo | | |
| 2002/0054163 A1 * | 5/2002 | Yamada et al. | ................ | 345/848 |
| 2002/0153721 A1 * | 10/2002 | Brooks et al. | ................ | 283/114 |
| 2002/0161648 A1 * | 10/2002 | Mason et al. | ................ | 705/14 |
| 2003/0028458 A1 * | 2/2003 | Gaillard | ................ | 705/35 |
| 2003/0208678 A1 * | 11/2003 | Chiu et al. | ................ | 713/168 |
| 2003/0220866 A1 * | 11/2003 | Pisaris-Henderson et al. | | 705/37 |
| 2004/0030598 A1 * | 2/2004 | Boal | ................ | 705/14 |
| 2004/0133793 A1 * | 7/2004 | Ginter et al. | ................ | 713/193 |
| 2004/0214611 A1 * | 10/2004 | Jong et al. | ................ | 455/566 |
| 2005/0125416 A1 * | 6/2005 | Kirsch et al. | ................ | 707/10 |
| 2005/0203799 A1 * | 9/2005 | Faber et al. | ................ | 705/14 |
| 2005/0251445 A1 * | 11/2005 | Wong et al. | ................ | 705/14 |
| 2006/0136294 A1 * | 6/2006 | Linden et al. | ................ | 705/14 |

* cited by examiner

*Primary Examiner* — Bennett Sigmond
*Assistant Examiner* — Rodney Henry (57) ABSTRACT

A pay-per-click system and method for presenting pay-per-click information are disclosed. In one of many possible embodiments, information is provided remotely from a remote subsystem to an access device. The information includes hidden information and at least one link to the hidden information. The access device presents the link for consideration by a user of the access device. The hidden information is kept hidden by the access device until the user selects the link. The access device reveals the hidden information in response to the user selecting the link. The access device is able to reveal the hidden information by relying on information stored directly on the access device and without obtaining additional information from the remote subsystem or from another remote location.

28 Claims, 6 Drawing Sheets

PAY-PER CLICK INFORMATION SYSTEM AND METHOD

FIELD

A pay-per-click information system and method are disclosed. The system and method are configured to present pay-per-click information in response to a user selection of a pay-per-click link.

BACKGROUND OF THE INVENTION

With the extensive growth of the Internet, many people, businesses, and organizations have turned to the Internet for advertising. One form of online advertising commonly known as pay-per-click advertising involves the billing of advertisers for each selection of an advertisement hyperlink. For example, an advertiser typically enters into a pay-per-click agreement with a host of a website. The host then posts an advertisement for the advertiser on the website. The advertisement typically includes a hyperlink that, when selected by visitors to the website, will direct the visitors to another website, which is typically a website operated by the advertiser. In accordance with the pay-per-click agreement between the advertiser and the host, the host bills the advertiser for each selection of the hyperlink.

Many advertisers prefer pay-per-click advertising over other billing arrangements for online advertisements because payment is required only when the advertisement successfully influences users to select a hyperlink in search of more information. With pay-per-click advertising, advertisers reduce their risk, and potentially their costs, by paying only for tangible results produced by posted advertisements.

Many hosts of websites use pay-per-click advertising as a tool to attract potential advertisers. For example, many websites exist that may or may not prove to be an effective host for one or more advertisements of a particular advertiser. The hosts of these websites may be able to attract certain advertisers only by allowing those advertisers to pay for their advertisement on a pay-per-click basis.

However, conventional pay-per-click techniques are not without shortcomings. One significant shortcoming is the traditional reliance upon different websites to obtain and present additional information to visitors requesting the information. When a visitor to a host website selects an advertisement hyperlink, a request for additional information is sent to a server, typically either a server of the host website or a server of the selected hyperlink. In some cases, the request is sent to a third party server. The server identified in the advertisement hyperlink processes the request for additional information and sends it back to the requestor. The additional information redirects the visitor to another website (e.g., the advertiser's website) that contains the additional information.

The practice of requesting and receiving the additional information from a server introduces a delay between the instant when the visitor selected the hyperlink and the instant when the additional information is presented to the visitor. Savvy users of the Internet are typically aware of such delays and may factor foreseeable delays into decisions of whether to select an advertisement hyperlink. Thus, many users of the Internet, especially those with busy schedules and/or relatively slow Internet connections, may choose not to select a particular advertisement hyperlink because of the potential delay in receiving additional information.

Another conventional pay-per-click practice may similarly lead users of the Internet away from selecting advertisement hyperlinks. When a visitor to a host website selects an advertisement hyperlink, the visitor is typically whisked away to another website (e.g., the website of the advertiser). The current web browser window of the visitor may be directed to another website, or a new web browser window may be opened on the computer screen of the visitor. These practices take the visitor away from the host website. If the visitor is not yet finished with the host website, he or she may feel frustration in being directed to another website. Such an experience may influence the visitor toward not selecting advertisement hyperlinks in the future and to have undesirable ill-will toward the host website having the hyperlink.

Both advertisers and the operators of host websites suffer from the conventional pay-per-click practices described above. Advertisers may lose business as visitors to the host websites elect not to select advertisement hyperlinks. Advertisers and the operators of a host website including the hyperlink may also damage their reputation by surprisingly directing visitors away from the host website to a different website. Operators of the host websites also risk losing traffic as visitors are taken away from the host website even if the visitor desires to use the link. These issues may eventually result in a loss of future patronage to both the advertiser and the host website, as well as a decrease in the amount of advertising fees that a host website can command.

SUMMARY OF THE INVENTION

A pay-per-click system and method are provided for presenting pay-per-click information in response to a user selection of a pay-per-click link. In one of many possible embodiments, information is provided remotely from a remote subsystem to an access device. The information includes hidden information and at least one link to the hidden information. The access device presents the link for consideration by a user of the access device. The hidden information is kept hidden by the access device until the user selects the link. The access device reveals the hidden information in response to the user selecting the link. The access device is able to reveal the hidden information by relying on information stored directly on the access device and without obtaining additional information from the remote subsystem or from another remote location. In several embodiments, the hidden information includes pay-per-click information.

In several embodiments, the information, including the hidden information and the link to the hidden information, is provided remotely from the remote subsystem to the access device as part of a downloaded web page. The access device is configured to reveal the hidden information as part of the web page and without directing the user away from the web page.

The disclosure will be more fully understood upon reading the following detailed description in conjunction with the accompanying drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION

I. Overview

A pay-per-click information system and method (collectively "system") are configured to present pay-per-click information in response to a user selection of a pay-per-click link. The system is configured to provide information remotely from a remote subsystem to an access device physically accessible by a user. The information includes hidden pay-per-click information and one or more links to the pay-per-click information. The information, including the links, may be presented to the user while the pay-per-click information remains hidden. Because the pay-per-click information is included as part of the overall information provided to the access device, the pay-per-click information may be presented to the user immediately upon selection of a link to the pay-per-click information, without having to request additional information from the remote subsystem or from another remote location (e.g., a host, advertiser, or third-party server). There is essentially no delay in revealing the pay-per-click information to a user because additional information need not be requested from a remote server.

Further, the system enables presentation of pay-per-click information on originating host web pages (i.e., inline with the host web pages), without directing users away from the host web page. This allows users to remain on the host web page and to select multiple pay-per-link hyperlinks during a single visit to a particular host web page.

The system is also able to send pay-per-click records, including billing and log information in the background. This is performed transparently to the user without the introduction of a noticeable delay into the revealing of the pay-per-click information to the user.

II. Introduction of Elements

Figure 1:
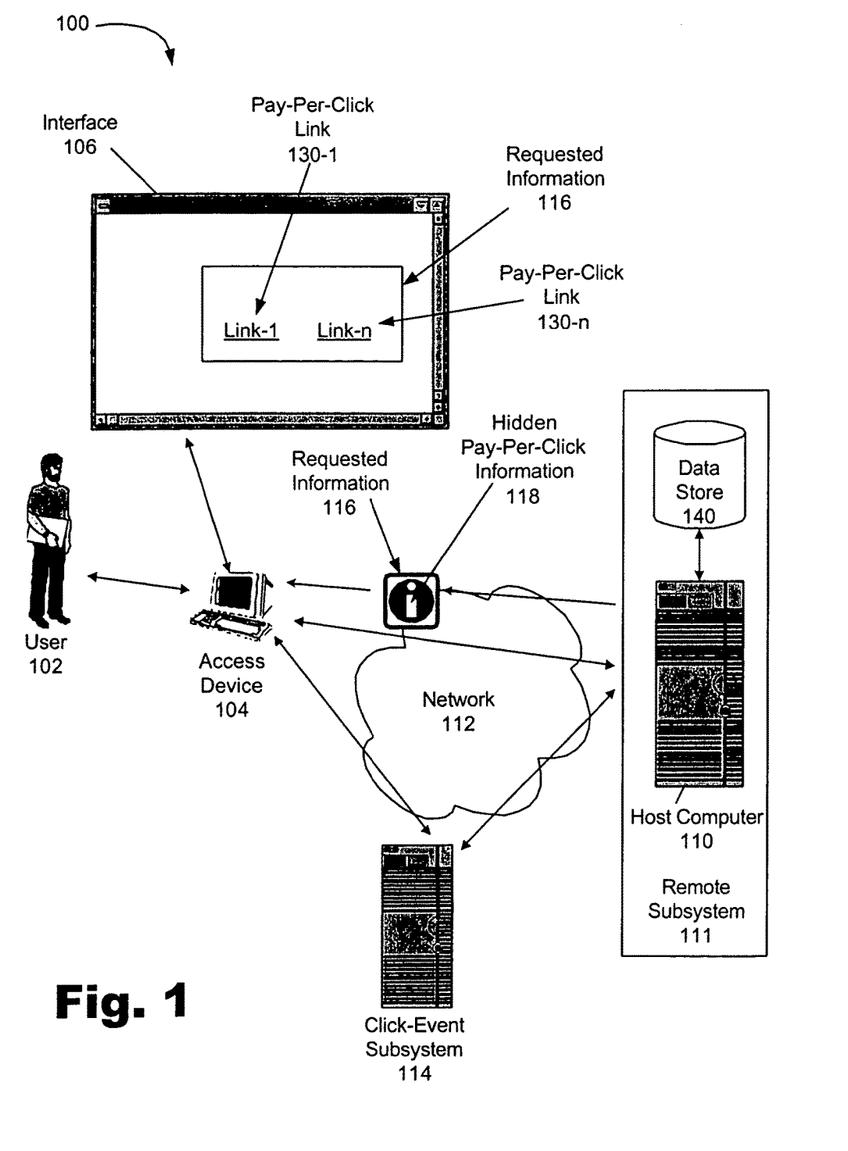
FIG. 1 illustrates an example of an application of a pay-per-click system, according to one embodiment.

FIG. 1 illustrates an example of an application of a pay-per-click information system 100, according to one embodiment. As shown in FIG. 1, a user 102 may use an access device 104 in physical proximity to the user 102 and having an interface 106 for interaction with the user 102. The access device 104 is configured to communicate with a host computer 110 of a remote subsystem 111 located at a different physical location by way of a network 112. The access device 104 may generate the interface 106, which may be used by the user 102 to enter information to be sent to the remote subsystem 111 and/or to consider information received from the remote subsystem 111. The access device 104 may also communicate with a click-event subsystem 114 also located at a different physical location than the access device 104. Each of these components of the system 100 will now be described in detail.

A. User

The user 102 is typically a human being who can utilize the access device 104 to input information into the system 100 and/or to consider information output by the system 100. However, the user 102 may be another living organism, an automated agent, or some form of intelligence technology that is configured to provide input to and/or consider output from the system 100.

B. Access Device

The access device 104 can include any device physically accessible to the user 102 that allows the user 102 to provide input to or otherwise access the remote subsystem 111. For example, the access device 104 can include, but is not limited to, desktop computers, laptop computers, personal data assistants, cellular telephones, satellite pagers, wireless internet devices, embedded computers, video phones, network interface cards, mainframe computers, mini-computers, programmable logic devices, vehicles, entertainment devices, gaming devices, and other future devices that may not yet currently exist. The access device 104 can also include various peripherals such as a terminal, keyboard, mouse, screen, printer, stylus, input device, output device, or any other apparatus that can help relay information between users 102 and the interface 106.

The access device 104 typically includes instructions that may be executed by a processor (not shown) to enable communication with other devices over the network 112. The instructions may be compatible with any communication protocol useful for communicating over the network 112. In particular, the instructions may enable communication between the access device 104 and the host computer 110. Similarly, the instructions may enable communication between the access device 104 and the click-event subsystem 114. The instructions may be in any computer-readable format, including software, firmware, microcode, and the like. In one embodiment, the access device 104 is equipped to communication with other devices over the Internet.

The access device 104 may include instructions for generating and operating the interface 106. These instructions may be in any computer-readable format, including software, firmware, microcode, and the like. When executed by a processor (not shown) of the access device 104, the instructions may present the interface 106 to the user 102.

While FIG. 1 shows a single access device 104, this is only illustrative. One or more access devices 104 may communicate with the remote subsystem 111 and benefit from pay-per-click information features provided by the remote subsystem. Examples of these pay-per-click features will be described in detail below.

C. Interface

The access device 104 may present the interface 106 to users 102 as a way for the users 102 to initiate communications with and/or consider communications from the remote subsystem 111. The interface 106 is equipped to present information to users 102 and to receive input from the users 102. The interface 106 may comprise one or more graphical user interfaces ("GUI") capable of displaying information and receiving commands from users 102.

In many exemplary embodiments, the interface 106 includes a web browser, such as version four or higher of Internet Explorer® offered by Microsoft Corporation of Redmond, Wash. Preferably, the web browser is equipped and enabled with, event handlers, image object constructors, as well as Javascript and dynamic hypertext markup language capabilities, which are well-known in the art.

The interface 106 is not limited to a web form embodiment (e.g., requiring a web browser for access) and may include many different types of interfaces 106 that enable users 102 to use the access device 104 to communicate with the remote subsystem 111. The interface 106 may support various types of input from users 102. Merely by way of example, the interface 106 may include voice recognition, eye tracking, gesture recognition, pattern recognition, motion detection, and/or thought recognition applications, to name a few.

D. Network

The network 112 supports communication between the access device 104 and the remote subsystem 111. The network 112 may include any type of communications network or other connection suitable for carrying information between the access device 104 and the host computer 110 of the remote subsystem 111. For example, the network 112 may include, but is not limited to, an intranet, internet, local area network, wide area network, metropolitan area network, virtual network, wireless network, cellular network, satellite network, and any other type of connection technology suitable for communicatively connecting the access device 104 to the host computer 110. In many embodiments, the network 112 includes the Internet.

While FIG. 1 shows a single network 112, it is anticipated that other embodiments may includes more than one network 112. For example, a first network 112 may support communication between the access device 104 and the host computer 110, while a second network 112 supports communication between the access device 104 and the click-event subsystem 114.

E. Remote Subsystem

The remote subsystem 111 is located remotely to the access device 104. The remote subsystem 111 may include any devices helpful for supporting communications between it and the access device 104 over the network 112. In the embodiment shown in FIG. 1, the remote subsystem 111 includes the host computer 110 and a data store 140 communicatively coupled together.

1. Host Computer

The host computer 110 can include any device or combination of devices that allows the processing of the system 100 to be performed. The host computer 110 may be a general purpose computer capable of running a wide variety of different software applications or a specialized device limited to particular functions. In some embodiments, the host computer 110 includes a network of computing devices accessible by the access device 104. The host computer 110 may include any type, number, form, or configuration of processors, system memory, computer-readable mediums, peripheral devices, and operating systems. The host computer 110 may also include bio-computers or other intelligent device (e.g., artificially intelligent device). In many embodiments, the host computer 110 includes a server and the access device 104 includes a client device capable of accessing the server.

The host computer 110 is capable of executing steps for performing the functionality of the system 100, including receiving requests for information from access devices 104 and providing requested information 116 to the access devices 104 in response to the requests. When the host computer 110 sends the requested information 116 to any particular requesting access device 104, the host computer 110 may embed the requested information 116, including hidden pay-per-click information 118, in a data object (e.g., a web page) that may be sent (e.g., downloaded) to the access device 104.

The hidden pay-per-click information 118 may be labeled such that when the access device 104 uses the interface 106 to present the requested information 116 to the user 102, the hidden pay-per-click information 118 remains hidden from the user 102. However, the requested information 116 may include one or more pay-per-click links 130-1 and 130-*n* (collectively the "pay-per-click links 130"), which are presented to the user 102 as shown in the interface 106 of FIG. 1. The user 102 may select any of the pay-per-click links 130 to cause the access device 104 to reveal the corresponding hidden pay-per-click information 118. When the user 102 selects any particular pay-per-click link 130, the access device 104 recognizes the selection and responds by presenting the corresponding hidden pay-per-click information 118 to the user 102, without having to request any additional information from the remote subsystem 111 or from another remote location (e.g., an advertiser's server). The presenting of the hidden pay-per-click information to the user 102 in response to a selection of a pay-per-click link 130 will be described in greater detail below.

The functionality of the host computer 110 may be embodied or otherwise carried on a medium that can be read by the host computer. The medium carrying the instructions (e.g., software processes) can be part of or otherwise communicatively coupled to the host computer 110. More specifically, the functionality of the host computer 110 may be embodied as software, hardware, firmware, and other known forms of computer-readable instructions. The instructions may be stored as computer-readable instructions in random access memories, read-only memories (e.g., CD-ROMs), optical storage devices, application-specific devices (e.g., application-specific integrated circuits), and any other known medium or device capable of storing computer-readable instructions.

The instructions embodying the functionality of the host computer 110 may be implemented in operating systems, applications software, and any other computer program. In one embodiment, the host computer 110 includes instructions for embedding information in web pages (e.g., web pages defined by hypertext markup language) and downloading the web pages to access devices 104. The information embedded in the web pages may include the requested information 116, pay-per-click information 118, pay-per-click links 130, and uniform resource locator (URL) address for the host computer 110 or for the click-event subsystem 114. Any suitable programming languages may also be used to implement the instructions for the functionality of the host computer 110.

2. Data Store

As shown in FIG. 1, the host computer 110 may be communicatively coupled to a data store 140. The data store 140 may comprise one or more storage mediums or devices, including databases. The data store 140 may be configured to store predefined information that may be searched or otherwise accessed by the host computer 110. The predefined information may include listings of a directory service application. The listings may include contact information such as names, addresses, telephone numbers, e-mail addresses, and web site links. The listings may include business listings having advertisement information and/or descriptions of services or products offered. The listings may include pay-per-click information 118 and pay-per-click links 130 to the pay-per-click information 118. Third parties may provide the requested information 116 under pay-per-click advertising agreements.

The host computer 110 can include a search server configured to search the predefined information of the data store 140 to identify at least a subset of the predefined information based on a search request. The identified subset may match search criteria provide by the user 102. The subset is referred to as the requested information 116.

F. Requested Information

The requested information 116 may comprise any information requested by the user 102. In one embodiment, the requested information 116 includes listings of contact information of a directory services application. The host computer 110 may format the requested information 116 for transport and/or presentation to the user 102. As discussed above, in one embodiment, the host computer 110 includes a web server configured to embed the requested information 116 in a web page and download the web page to the access device 104.

G. Pay-Per-Click Information

The requested information 116 may include pay-per-click information 118. In one embodiment, the pay-per-click information 118 includes phone numbers and e-mail addresses.

The pay-per-click information 118 may be stored and transported as part of the requested information 116. However, the pay-per-click information 118 may be labeled so that it will remain hidden from the user 102 until the user 102 selects a particular pay-per-click link 130 to cause the corresponding pay-per-click information 118 to be revealed. In particular, the pay-per-click 118 information may be identified as a "hidden" type of information by identifiers. The identifiers (e.g., HTML tags) may be processed by the interface 106 to determine that the pay-per-click information 118 remain hidden from the user 102.

Selection of the pay-per-click links 130 may cause the interface 106 to convert an identifier associated with the pay-per-click information 118 from a "hidden" type to a "non-hidden" type. This causes the pay-per-click information 118 to be presented to the user 102 in response to a selection of the corresponding pay-per-click link 130. Because the pay-per-click 118 information 118 was included as part of the requested information 116, the access device 104 is able to reveal the pay-per-click 118 information essentially without delay and without obtaining additional information from the remote subsystem 111 or from another remote location. Further, the pay-per-click information 118 can be revealed as part of the requested information 116, without directing users 102 away from the requested information 116.

H. Click-Event Subsystem

The click-event subsystem 114 is located remotely to the access device 104. When the access device 104 responds to a user selection of a pay-per-click link 130 by presenting hidden pay-per-click information 118 to the user 102, the access device 104 may send billing data to the click-event subsystem 114. The access device 104 may send a record of a pay-per-click event to the click-event subsystem 114 (and/or to the remote subsystem 111) in the background so that the reporting is performed transparently to the user 102 and without introducing any noticeable delay in the revealing of the pay-per-click information 118. As mentioned above, the requested information 116 may include a URL address (not shown) for other devices (e.g., the click-event subsystem 114 and the host computer 110). The interface 106 and the access device 104 may work together to send records of click events to devices identified by the URL addresses. Different URL addresses specific to particular pay-per-click information 118 may be provided to allow the reporting of different click events to different devices.

The click-event subsystem 114 may include a general purpose computer capable of running a wide variety of different software applications or a specialized device limited to particular functions. In some embodiments, the click-event subsystem 114 includes a network of computing devices accessible by the access device 104. The click-event subsystem 114 may include any type, number, form, or configuration of processors, system memory, computer-readable mediums, peripheral devices, and operating systems. The click-event subsystem 114 may also include bio-computers or other intelligent device (e.g., artificially intelligent device). In many embodiments, the click-event subsystem 114 includes a server, and the access device 104 is a client device accessing the server.

The click-event subsystem 114 may include computer-readable instructions configured to cause it to perform pay-per-click billing functions. For example, the click-event subsystem 114 may be configured to record and track pay-per-click events, as well as to organize the pay-per-click events for billing out to sponsors (e.g., advertisers) of the pay-per-click information 118. The click-event subsystem 114 may also initiate actual billings of each of the sponsors based on the number of recorded pay-per-click events for each sponsor.

In many embodiments, the click-event subsystem 114 may include a separate computer(s) provided and/or operated by a third party. In other embodiments, the click-event subsystem 114 may be included as part of the remote subsystem 111. Regardless of the configuration of the remote subsystem 111 and the click-event subsystem 114 in relation to each other, the remote subsystem 111 may be further configured to perform an audit of the billings produced by the click-event subsystem 114. For example, when the interface 106 responds to a selection of any particular pay-per-click link 130 by presenting hidden pay-per-click information 118 to the user 102, the access device 104 may provide log data to the host computer 110 over the network 112. The log data is sent in the background, transparent to the user 102. The host computer 110 may be configured to record and track the log data for use in auditing pay-per-click billings performed by the click-event subsystem 114. The host computer 110 may perform an audit by comparing the billings of the click-event subsystem 114 against the log data recorded by the host computer 110.

While an exemplary application of the system 100 is shown in FIG. 1, those skilled in the art will recognize that the exemplary components illustrated in the Figure are not intended to be limiting. Indeed, those skilled in the art will recognize that other alternative hardware environments may be used in other embodiments.

III. Process Flow View

Figure 2:
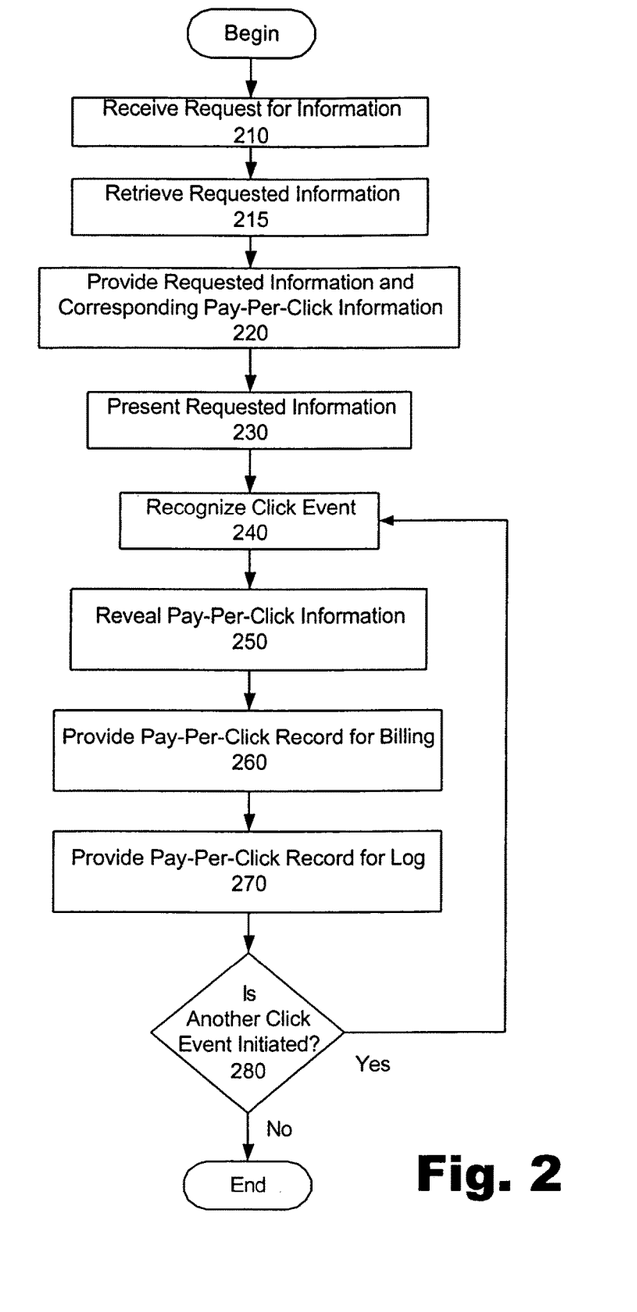
FIG. 2 is a flowchart illustrating an example of a process for presenting pay-per-click information using the system of FIG. 1.

FIG. 2 is a flow chart illustrating an example of a method for presenting pay-per-click information. While FIG. 2 illustrates exemplary steps according to one embodiment, other embodiments may omit, add to, and/or modify any of the steps shown in FIG. 2.

The method begins with the receiving of a request for information at step 210. The remote subsystem 111 may receive the request for information from the access device 104 over the network 112. The request for information may be in any format capable of being communicated between the access device 104 and the remote subsystem 111. In some embodiments, the request includes a request for a specific web site or web page. In other embodiments, the request includes a search for information. The search may be of any scope. For instance, the search may be performed over the Internet using known search engines (not shown). In accordance with another approach, the search is performed within a particular web application using a search server (not shown). For example, the user 102 may submit a search for specific information stored as part of a directory services application, such as SuperPages.com® provided by Verizon Services Corporation. SuperPages.com® provides capabilities to users 102 for looking up and/or searching for listings having contact information such as names, addresses, phone numbers, email addresses, and website links for people, businesses, and other organizations.

When appropriate requested information 116 has been located and retrieved at step 215, the requested information 116 and its corresponding pay-per-click information 118 may be prepared for transport and/or presentation to the user 102. For example, in many web-based embodiments, the requested information 116 and hidden pay-per-click information 118 may be embedded within a web page (e.g., a hypertext markup language (HTML) page) using known techniques for creating web pages. In a directory services application for example, listings of different persons or organizations having information matching a search request may be compiled into one or more web pages. The web pages may be defined using any suitable programming language (e.g., HTML, XML, etc.) and may include hypertext links (e.g., pay-per-click links 130) to the hidden pay-per-click information 118.

In some embodiments, the host computer 110 may be configured to prepare the pay-per-click information 118 for transport by encrypting the pay-per-click information 118 before sending it to the access device 104. This helps ensure the integrity of pay-per-click arrangements by protecting the pay-per-click information 118 from being accessed in an unintended manner. The interface 106 or the access device 104 may be equipped with a key for decrypting the pay-per-click information 118 before revealing it to the user 102. Any suitable encryption technique known to those skilled in the art may be employed.

At step 220, the requested information 116 and corresponding, hidden pay-per-click information 118 are provided to the access device 104 in response to the request for information. The remote subsystem 111 sends (e.g., downloads) the requested information 116 and hidden pay-per-click information 118 to the access device 104. In embodiments in which the requested information 116 is embedded in web pages, the requested information 116 and pay-per-click information 118 may be provided to the access device 104 in the form of one or more HTML pages. As discussed above, the pay-per-click information 118 may be included in the web page and identified as "hidden," meaning that the pay-per-click information 118 will be downloaded to the access device 104 but not be displayed to the user 102. The identifier instructs the interface 106 to keep the information hidden from view. However, pay-per-click links 130 provide users 102 with the ability to access the pay-per-click information 118.

When the access device 104 receives the requested information 116 and the pay-per-click information 118 from the remote subsystem 111, the access device 104 causes the requested information 116 to be presented to the user 102 at step 230. The requested information 116 may be presented to the user 102 through the interface 106. In particular, the requested information 116 and the pay-per-click information 118 are configured to direct the interface 106 what to present and not present to the user 102. The interface 106 will present the requested information 116, including the pay-per-click links 130, to the user 102, while the hidden pay-per-click information 118 remains hidden from the user 102.

The user 102 is provided with the capability to instruct the access device 104 to reveal the pay-per-click information 118 by selecting the per-per-click link 130. The user 102 may select the pay-per-click link 130 using any suitable input signal. In many embodiments, the selection may be made by using a mouse, keyboard, or other input device to "click on" the pay-per-click link 130. This is referred to as a click event.

At step 240, a click event is recognized. The interface 106 may be configured to use any known technology for recognizing click events. The click events indicate the user selection of pay-per-click links 130.

At step 250, the embedded pay-per-click information 118 is revealed to the user 102 in response to the click event. In many embodiments, the pay-per-click information 118 is revealed by displaying it with the requested information 116 on a graphical user interface. To reveal the pay-per-click information 118, the access device 104 may convert the pay-per-click information 118 from a "hidden" type to a "non-hidden" type. This may be performed using HTML tags. The selected pay-per-click link 130 may be changed to no longer be displayed as a hyperlink. This helps direct the user 102 to the newly revealed pay-per-click information 118. Because the revealing of the pay-per-click information 118 does not require additional information from the remote subsystem 111 or from another remote location, the reveal is performed essentially immediately upon the user 102 selecting the pay-per-click link 130. Further, the pay-per-click information 118 may be presented within the web page containing the requested information 116, thereby allowing the user 102 to remain at the originating web page.

To perform step 250 for many web-based embodiments, the interface 106 is equipped and enabled with Javascript and dynamic HTML capabilities. These well-known capabilities, which exist in most current web browsers, support the revealing of the pay-per-click information 118 described above.

At step 260, a record of the click event is provided for billing purposes. The record may be sent to the click-event subsystem 114 in the background, transparently to the user 102. In response to the selection of the pay-per-click link 130, the interface 106 calls an event handler, which instantiates an image object and passes a click uniform resource locator (URL) as an argument to an image object constructor. As mentioned above, the URL may be included in the requested information 116 sent from the remote subsystem 111 to the access device 104 and may include a URL address for the host computer 110, the click-event subsystem 114, or any other device on the network 112. The click URL may also include information related to the click event, including information about the subject searched for and the pay-per-click link 130 selected by the user 102. With this information, the click URL may be used in the background for tracking click events or for billing and management purposes.

Using Javascript and dynamic HTML technologies, the image object constructor builds a one pixel by one pixel blank object having the information contained in the click URL. As will be understood by those skilled in the art, the pixel object can be used by the interface 106 of the access device 104 to communicate with the click-event subsystem 114, the remote subsystem 111, or other network device in the background as the user 102 continues to view the requested information 116. The click-event subsystem 114 may be configured to use click event records to perform billing operations, including billing advertisers for click events.

At step 270, a record of the click event is provided for building a log of click events. The record may be provided by the access device 104 to the remote subsystem 111 in the background while the user 102 views the requested information 116 in uninterrupted fashion. The record may be sent to the remote subsystem 111 using the techniques discussed above for step 260.

The record of the click event sent to the remote subsystem 111 may be a duplicate of the record sent to the click-event subsystem 114. As discussed above, the host computer 110 may be configured to track and store log data for multiple click events. The log data may be used for management or auditing functions. For example, the host computer 110 may be configured to use the log data to audit the accuracy of bills being charged to sponsors of the pay-per-click information 118.

At step 280, it is determined whether another click event has been initiated by the user 102. If it is determined at step 280 that another click event has not been initiated, the method of FIG. 2 ends. On the other hand, if it is determined at step 280 that another click event has been initiated, processing returns to step 240, at which step the click event is recognized. Steps 240 through 280 may repeat to handle multiple pay-per-click events. In many web-based embodiments, users 102 are able to select multiple pay-per-click links 130 without being directed away from the originating web page.

While a majority of web browsers currently being employed on access devices 104 provide Javascript, dynamic HTML, or similar technologies capable of performing steps 250-270 as discussed above, other web browsers lacking such technology are still being employed on some access devices 104. Accordingly, the pay-per-click information 118 may be embedded in the requested information 116 in a manner that will cause web browsers lacking in suitable technology to reveal pay-per-click information 118 associated with a selected pay-per-click link 130 by reverting to the known technique of opening a new window in which to display the pay-per-click information 118.

IV. Examples of Interface Views for an Exemplary Web-Based Embodiment

Many embodiments include web-based implementations of the system 100. In web-based embodiments, the host computer 110 of the remote subsystem 111 may include a server, the network 112 may include the Internet, the access device 104 may include a client device configured to communicate over the Internet, and the interface 106 may include a web browser. FIGS. 3-6 illustrate different views of the interface 106 for a particular web-based embodiment at different points during execution of the exemplary method of FIG. 2.

Assuming an initial request for information from the user 102 includes a search of a directory services application for businesses that sell and deliver flowers, the host processor 110 may retrieve one or more listings for flower vendors from the data store 140. The host processor 110 may embed the listings into a web page (e.g., a web page defined with HTML). The host processor 110 may download the web page to the access device 104 over the network 112. The web page may direct the interface 106 of the access device 104 to display the web page to the user 102.

Figure 3:
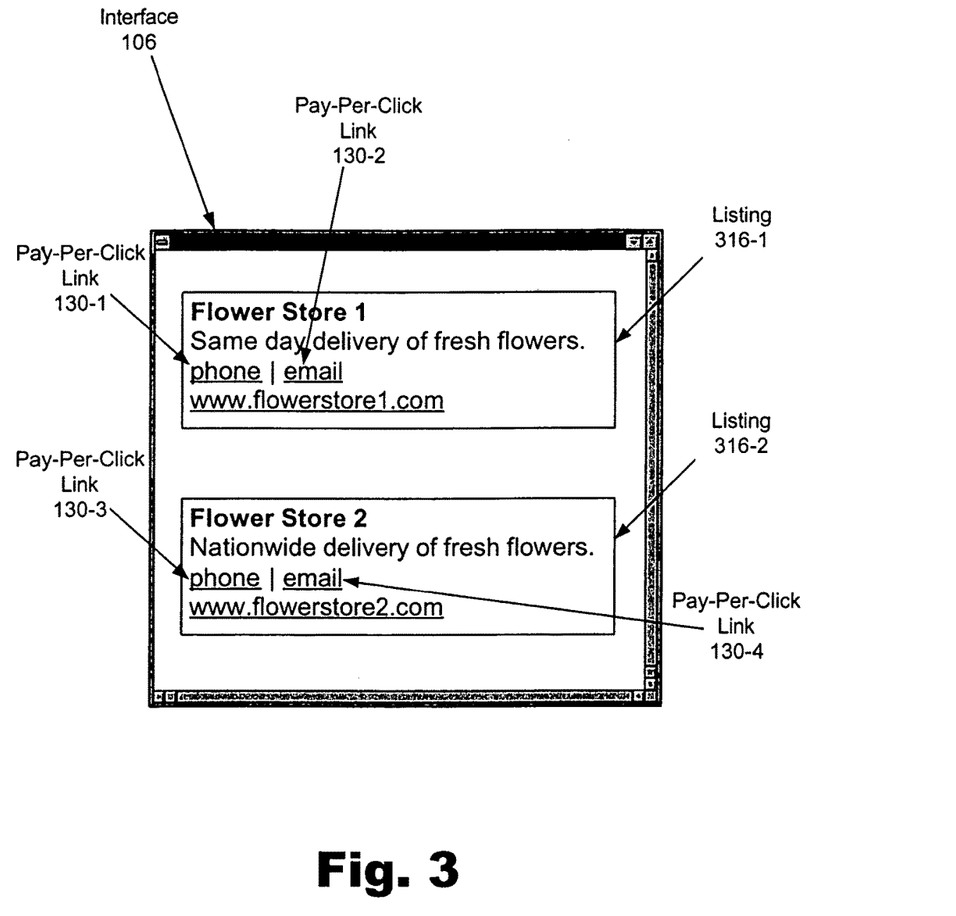
FIG. 3 illustrates an example of an interface displaying listings having pay-per-click links, according to one embodiment of the system of FIG. 1.

FIG. 3 illustrates the interface 106 displaying an example of a web page having two listings 316-1 and 316-2 (collectively the "listings 316"). As shown in FIG. 3, the listings 316 are each for flower vendors. The listings 316 each include pay-per-click links 130. Specifically, listing 316-1 includes pay-per-click links 130-1 and 130-2, while listing 316-2 includes pay-per-click links 130-3 and 130-4. Pay-per-click links 130-1 and 130-3 are identified as "phone" links, and pay-per-click links 130-2 and 130-4 are identified as "email" links.

Figure 4:
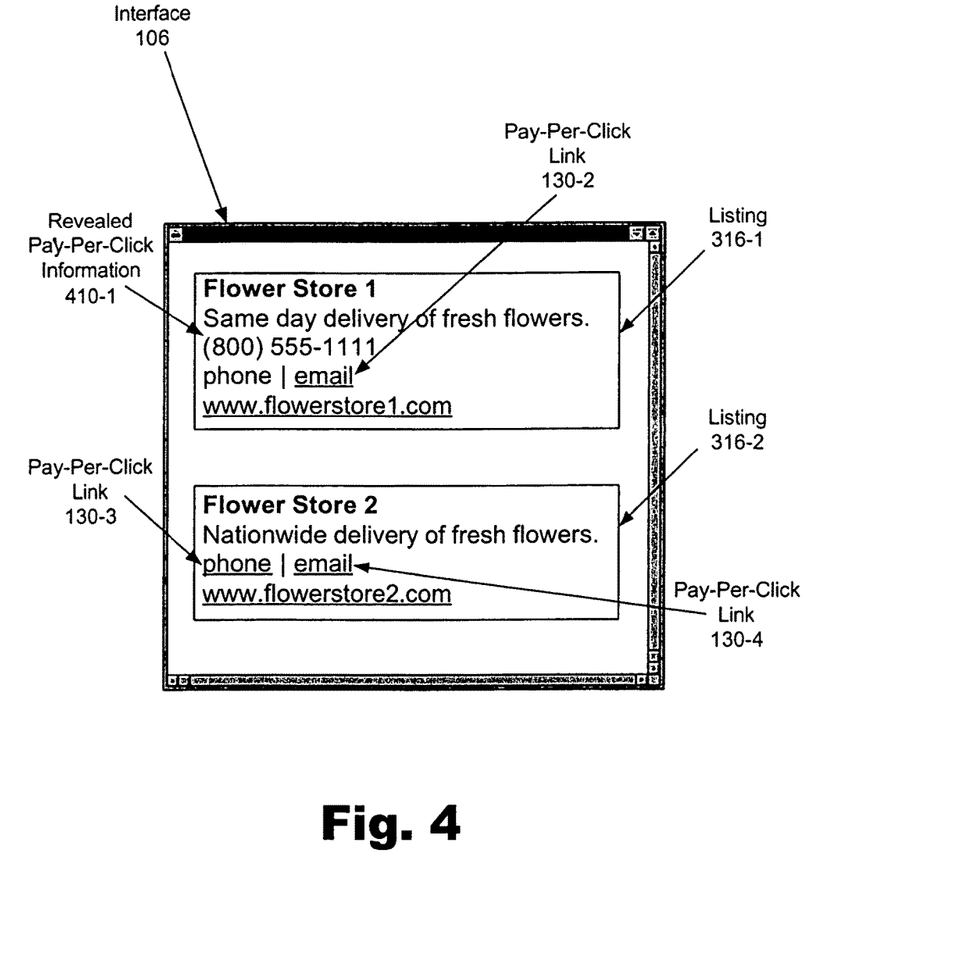
FIG. 4 illustrates the interface of FIG. 3 with pay-per-click information being displayed in response to selection of an exemplary pay-per-click link.

Assuming the user 102 selects the pay-per-click link 130-1 of the listing 316-1, pay-per-click information 118 associated with the link 130-1 will be revealed to the user 102 by the interface 106 of the access device 104. FIG. 4 illustrates the interface 106 displaying revealed pay-per-click information 410-1 in the form of a telephone number in response to the user 102 selecting the pay-per-click link 130-1. The revealed pay-per-click information 410-1 is associated with the pay-per-click link 130-1. As shown in FIG. 4, the pay-per-click link 130-1 has been converted and is no longer displayed as a link.

The pay-per-click information 410-1 is revealed essentially immediately upon the pay-per-click link 130-1 being selected by the user 102 because no additional information is requested from the remote subsystem 111, or from any other remote source. Further, the pay-per-click information 410-1 is revealed inline with the listings 316 on the web page, and the user 102 is able to select other pay-per-click links 130 without ever leaving the web page.

Figure 5:
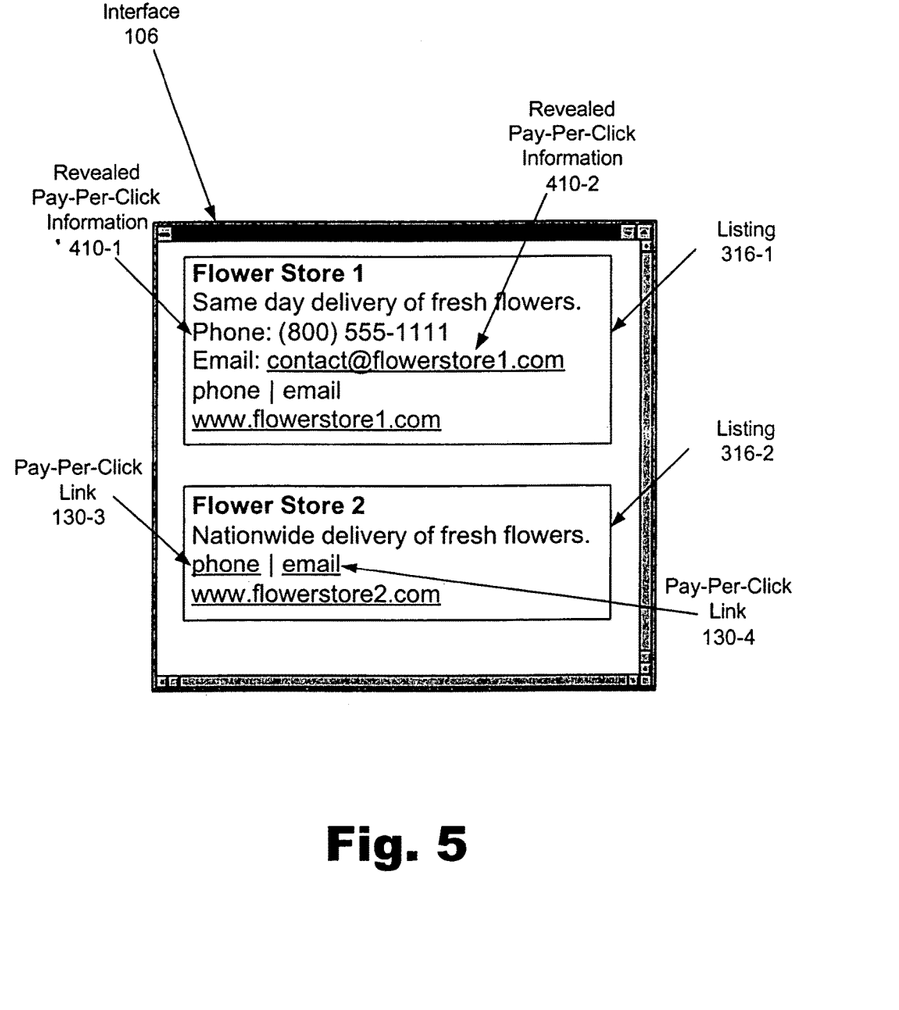
FIG. 5 illustrates the interface of FIG. 3 with pay-per-click information being displayed in response to selection of two exemplary pay-per-click links.

Assuming the user 102 next selects the pay-per-click link 130-2 of the listing 316-1, pay-per-click information 118 associated with the link 130-2 will be revealed to the user 102. FIG. 5 illustrates the interface 106 displaying revealed pay-per-click information 410-2 in the form of an email address in response to the user 102 selecting the pay-per-click link 130-2. The revealed pay-per-click information 410-2 is associated with the pay-per-click link 130-2. As shown in FIG. 5, the pay-per-click link 130-2 has been converted and is no longer displayed as a link.

Figure 6:
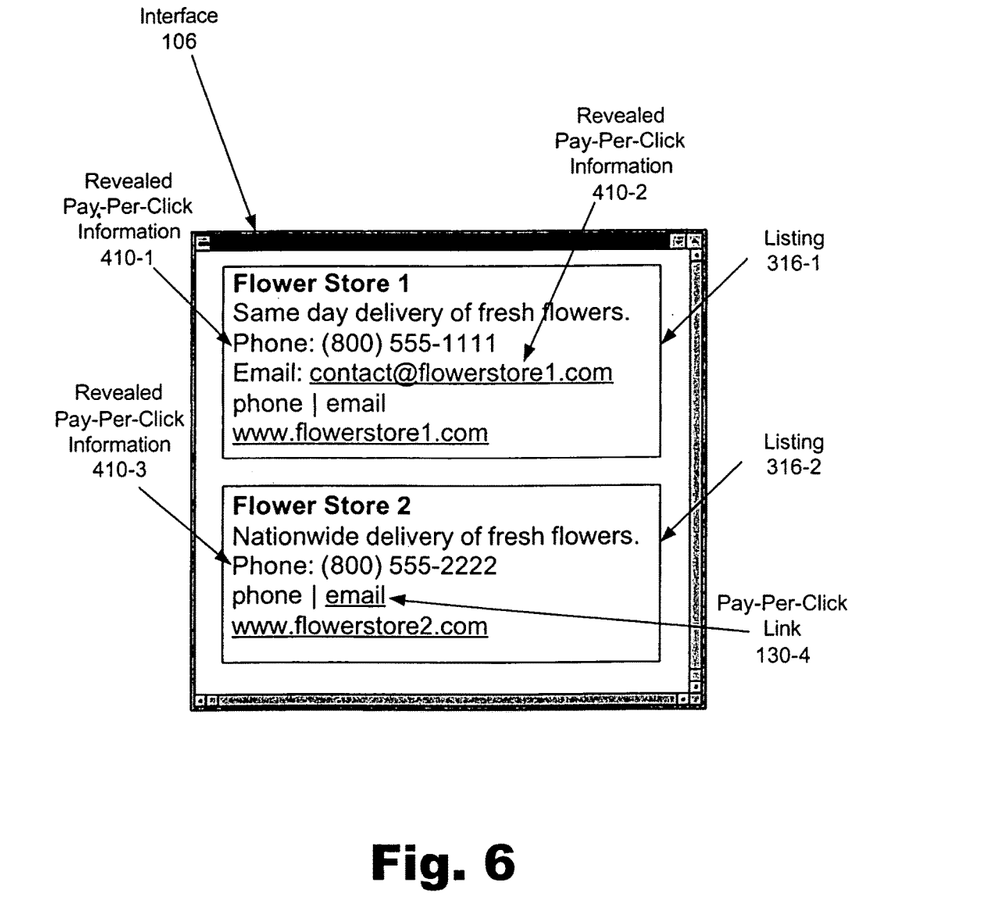
FIG. 6 illustrates the interface of FIG. 3 with pay-per-click information being displayed in response to selection of three exemplary pay-per-click links.

Assuming the user 102 next selects the pay-per-click link 130-3 of the listing 316-2, pay-per-click information 118 associated with the link 130-3 will be revealed to the user 102. FIG. 6 illustrates the interface 106 displaying revealed pay-per-click information 410-3 in the form of a telephone number in response to the user 102 selecting the pay-per-click link 130-3. The revealed pay-per-click information 410-3 is associated with the pay-per-click link 130-3. As shown in FIG. 6, the pay-per-click link 130-3 has been converted and is no longer displayed as a link.

In conclusion, the embodiments of the system and method disclosed above enable hidden pay-per-click information 118 to be provided in a manner that allows users 102 to instruct the interface 106 of the access device 104 to reveal the pay-per-click information 118 without having to seek additional information from the remote subsystem 111 or from another remote location. The pay-per-click information 118 is revealed without noticeable delay and without directing the user 102 away from the requested information 116 currently presented by the interface 106. Click event records are able to be reported in the background, without interrupting viewing of the requested information 116 and pay-per-click information 118 by the user 102. The click event records may be used to generate billings for presentations of pay-per-click information 118 to users 102.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. For example, while web-based directory services applications have been used to describe some embodiments of the invention, other embodiments of the invention are not necessarily limited to directory services applications or even to web-based technologies. Many other types of pay-per-click information applications may be implemented without departing from the spirit and scope of the invention. It is intended that the scope of the invention be defined by the following claims.

What is claimed is:

1. A method of presenting pay-per-click information, the method comprising:
    embedding information in a web page utilizing a remote subsystem that includes a computing device, the information including hidden information and at least one link to the hidden information;
    providing the web page from the remote subsystem to an access device, the access device presenting the at least one link for consideration by a user of the access device;
    keeping the hidden information hidden until the user selects the at least one link;
    revealing the hidden information in response to the user selecting the at least one link, the hidden information being stored directly on the access device without the access device obtaining additional information from the remote subsystem in response to the user selecting the at least one link; and
    sending a record of the user selecting the at least one link to the remote subsystem while the hidden information is revealed.

2. The method of claim 1, further comprising providing the web page to the access device by downloading the web page to the access device over a network.

3. The method of claim 1, wherein said revealing step includes presenting the hidden information as part of the web page, without directing the user away from the web page.

4. The method of claim 1, wherein the record is sent transparently in the background.

5. The method of claim 4, further comprising:
    the access device sending a duplicate record of the user selecting the at least one link to the remote subsystem, the duplicate record being sent transparently in the background; and
    using the duplicate record to audit pay-per-click billings generated by the remote click-event subsystem.

6. The method of claim 1, further comprising providing the record of the user selecting the at least one link for purposes of billing a sponsor of the hidden information for the user selecting the at least one link.

7. The method of claim 1, further comprising encrypting the hidden information before providing the hidden information to the access device, and wherein said revealing step includes decrypting the hidden information.

8. The method of claim 1, wherein said revealing step is performed essentially immediately upon the user selecting the at least one link, without having to wait for additional information from the remote subsystem.

9. The method of claim 1, wherein the information includes at least one listing of a directory services application.

10. A method of presenting pay-per-click information, the method-comprising:
    receiving a request for information remotely from an access device;
    embedding the information in a web page utilizing a remote subsystem that includes a computing device, the information including hidden information and at least one link to the hidden information;
    downloading the web page from the remote subsystem to the access device;
    the access device presenting the web page, including the at least one link, for consideration by a user of the access device, the hidden information remaining hidden until the user selects the at least one link;
    revealing the hidden information in response to the user selecting the at least one link, the hidden information being revealed as part of the web page and stored directly on the access device without the access device obtaining additional information from the remote subsystem in response to the user selecting the at least one link; and
    sending a record of the user selecting the at least one link to the remote subsystem while the hidden information is revealed.

11. The method of claim 10, further comprising the access device providing the record of the user selecting the at least one link for purposes of billing a sponsor of the hidden information for the user selecting the at least one link.

12. The method of claim 10, wherein said revealing step includes presenting the hidden information without directing the user away from the web page.

13. The method of claim 10, wherein the information includes at least one listing of a directory services application, the at least one listing being sponsored by a third party.

14. A pay-per-click information system, comprising:
    an access device; and
    a remote subsystem communicatively coupled to said access device, said remote subsystem being configured to:
    receive a request for information from said access device;
    embed said information in a web page, said information including hidden information and at least one link to said hidden information; and
    download said web page to said access device;
    wherein said access device is configured to:
    receive said web page provided by said remote subsystem;
    keep said hidden information hidden until a user of the access device selects said at least one link;
    reveal said hidden information in response to the user selecting said at least one link, the hidden information being stored directly on the access device without the access device obtaining additional information from the remote subsystem in response to the user selecting the at least one link; and
    receive a record of the user selecting the at least one link from the access device while the hidden information is revealed.

15. The system of claim 14, wherein said hidden information includes pay-per-click information sponsored by a third-party.

16. The system of claim 14, wherein said information includes at least one listing of a directory services application.

17. The system of claim 14, wherein said access device is configured to present said web page to the user of said access device, said hidden information remaining hidden from the user.

18. The system of claim 17, wherein said access device is configured to reveal said hidden information to the user of the access device as part of said web page in response to the user selecting said at least one link, without directing the user away from said web page.

19. The system of claim 17, wherein said information includes at least one uniform resource locator (URL) associated with said hidden information, said URL including an address of said remote subsystem or an address of a remote click-event subsystem.

20. The system of claim 14, further comprising a remote click-event subsystem communicatively coupled to said access device, and wherein said access device is configured to send said record of the user selecting said at least one link to said remote click-event subsystem, said record being sent transparently in the background.

21. The system of claim 20, wherein said remote click-event subsystem is configured to use said record for billing a sponsor of said hidden information.

22. The system of claim 20, wherein said access device is further configured to send a duplicate record of the user selecting said at least one link to said remote subsystem, said duplicate record being sent transparently in the background, and wherein said remote subsystem is configured to use said duplicate record to audit pay-per-click billings generated by said remote click-event subsystem.

23. The system of claim 14, wherein said remote subsystem is further configured to encrypt said hidden information before providing said hidden information to said access device, and wherein said access device is further configured to decrypt said hidden information.

24. The system of claim 14, wherein said access device is physically accessible to the user, and said remote subsystem is located remotely to said access device.

25. The system of claim 14, wherein said remote subsystem includes a web server, said access device includes a web browser, and said remote subsystem is communicatively coupled to said access device by the Internet.

26. The method of claim 4, further comprising generating a log of the record, the log including log information related to the user selecting the at least one link.

27. The method of claim 26, wherein the remote click-event subsystem organizes the record according to the log information.

28. The method of claim 27, wherein the log information includes the subject searched and selected by the user.

\* \* \* \* \*